(12) United States Patent
Mantuano et al.

(10) Patent No.: US 7,840,889 B2
(45) Date of Patent: Nov. 23, 2010

(54) APPARATUS AND METHOD FOR GENERATING SPREADSHEET FUNCTION SOURCE CODE FOR USE IN A SOURCE CODE APPLICATION

(75) Inventors: Brian Eric Mantuano, Visalia, CA (US); Santiago E. Becerra, Jr., San Diego, CA (US); Shawn Tsai, San Diego, CA (US); Jesse Calderon, San Diego, CA (US)

(73) Assignee: Business Objects Software Ltd., Dublin (IE)

( * ) Notice: Subject to any disclaimer, the term of this patent is extended or adjusted under 35 U.S.C. 154(b) by 865 days.

(21) Appl. No.: 11/695,502

(22) Filed: Apr. 2, 2007

(65) Prior Publication Data
US 2008/0244508 A1 Oct. 2, 2008

(51) Int. Cl.
*G06F 17/00* (2006.01)

(52) U.S. Cl. .................................... 715/212; 715/217

(58) Field of Classification Search ................. 715/212, 715/217
See application file for complete search history.

(56) References Cited

U.S. PATENT DOCUMENTS

| 5,926,822 | A * | 7/1999 | Garman | 715/201 |
| 7,010,779 | B2 * | 3/2006 | Rubin et al. | 717/106 |
| 2005/0081141 | A1 * | 4/2005 | Jonsson | 715/503 |
| 2006/0012568 | A1 * | 1/2006 | Halcrow et al. | 345/157 |
| 2006/0224946 | A1 * | 10/2006 | Barrett et al. | 715/503 |
| 2008/0016436 | A1 * | 1/2008 | Liu et al. | 715/212 |

* cited by examiner

*Primary Examiner*—Andy Ho
(74) *Attorney, Agent, or Firm*—Cooley LLP

(57) ABSTRACT

A computer-implemented method includes designating selected spreadsheet cells within a spreadsheet document. Spreadsheet function source code characterizing the functionality associated with the selected spreadsheet cells is generated. The spreadsheet function source code is incorporated into a source code application.

18 Claims, 7 Drawing Sheets

```
 1 <?xml version="1.0" encoding="utf-8"?>
 2 <mx:Application xlms:mx="http://www.adobe.com/2006/mxml" layout="absolute" xmls:Excel="BOBJ.Excel.*
 3     <Excel:Workbook id="Workbook"/>
 4     <Excel:Cell id="A3"/>
 5     <Excel:Cell id="A1"/>
 6     <Excel:Cell id="A2"/>
 7
 8   <mx:Script>
 9     <![CDATA[
10       public function startUp():Void (
11         A1. dependents = [A3];
12         A1. value = 10;
13
14         A2. dependents = [A3];
15         A2. value = 20;
16
17         A3. dependents = [];
18         A3. calc = function()(
19             {
20               return A1.value+A2.value;
21             }
22         }
23   ]]>
24   <mx:Script>
25   <mx:Hslider id="slider1" x="152" y="185" minimum="0" maximum="100" liveDragging="true"/>
26   <mx:Hslider id="slider1" x="152" y="230" minimum="0" maximum="100" liveDragging="true"/>
27   <mx:Hslider id="slider1" x="152" y="277" minimum="0" maximum="100" enabled="false"/>
28
29   <mx:Binding source="slider1.value" destination="A1.Value" />
30   <mx:Binding source="slider2.value" destination="A2.Value" />
31   <mx:Binding source="A3.value" destination="slider3.Value" />
32 </mx:Application>
33
```

FIG. 5

```
<mx:Hslider id="slider1" x="152" y="185" minimum="0" maximum="100" liveDragging="true"/>
<mx:Hslider id="slider1" x="152" y="230" minimum="0" maximum="100" liveDragging="true"/>
<mx:Hslider id="slider1" x="152" y="277" minimum="0" maximum="100" enabled="false"/>

<mx:Binding source="Slider1.value" destination="A1.Value" />
<mx:Binding source="Slider2.value" destination="A2.Value" />
<mx:Binding source="A3.value" destination="Slider3.Value" />
```

FIG. 6

APPARATUS AND METHOD FOR GENERATING SPREADSHEET FUNCTION SOURCE CODE FOR USE IN A SOURCE CODE APPLICATION

BRIEF DESCRIPTION OF THE INVENTION

This invention relates generally to the field of computer data analysis and graphics. More particularly, this invention relates to creation of spreadsheet function source code for incorporation into a source code application.

BACKGROUND OF THE INVENTION

Spreadsheet software provides tools for information workers to model complex mathematical relationships in fields such as finance, science and engineering. An individual that is capable of modeling complex mathematical relationships in a spreadsheet may not be able to transform that logic into source code that may be used in a larger application. Similarly, a software engineer may have a difficult time understanding and programming information associated with a complex spreadsheet.

Software tools typically provide limited functionality in creating graphic representations of input and output data and limited ability for users to export the data and mathematical models represented by the formulas contained in the spreadsheet cells to create custom application programs. Currently, relationships between cells in a spreadsheet cannot be exported as a stand-alone piece of software that may be incorporated in other application programs and/or executed independently of the underlying spreadsheet application. Consequently, there is a need for tools to allow software developers to capture and export information contained in a spreadsheet in a component form that can be easily integrated into other application programs, such as applications supporting graphical representations of spreadsheet data.

SUMMARY OF THE INVENTION

The invention includes a computer-implemented method of designating selected spreadsheet cells within a spreadsheet document. Spreadsheet function source code characterizing the functionality associated with the selected spreadsheet cells is generated. The spreadsheet function source code is incorporated into a source code application.

The invention also includes a computer readable storage medium with executable instructions to receive selected spreadsheet cells. Spreadsheet function source code characterizing the functionality associated with the selected spreadsheet cells is then generated.

BRIEF DESCRIPTION OF THE FIGURES

The invention is more fully appreciated in connection with the following detailed description taken in conjunction with the accompanying drawings, in which:

FIG. 5 illustrates a screen shot of an application program development environment incorporating the source code of FIG. 4 in accordance with an embodiment of the invention.

FIG. 6 illustrates source code bindings associated with an embodiment of the invention.

DETAILED DESCRIPTION OF THE INVENTION

The following terminology is used while disclosing embodiments of the invention:

An Application is a set of executable instructions to directly control the operation of a machine, such as a digital computer, to execute a specified task.

A Graphical Component is a visual element (e.g., chart, column, bar, button, radar, dial, slider, progress bar, gauge, spinner, table, and the like) representing data.

Data Values are data items that are associated with spreadsheet cells and graphical components. These values may represent a discrete value, ranges, strings, calculated values and the like. The data may be based on a separate application document, such as a sheet document.

A Programming Language is a set of semantic and syntactic rules to control the behavior of a machine, such as a digital computer. A programming language enables a programmer to precisely specify what data a computer will act upon, how these data will be stored/transmitted, and precisely what actions to take under various circumstances. C++, Java®, and Visual Basic® are examples of programming languages.

Source Code is a sequence of statements and/or declarations written in a human readable programming language to execute a task. Source code is typically generated in a form whereby it can be compiled in whole or part into a machine readable form.

A Spreadsheet Application is an application program for creating spreadsheet files. Microsoft Excel® is one example of a spreadsheet application. A spreadsheet is a rectangular table (or grid) of information, often including financial information.

Figure 1:
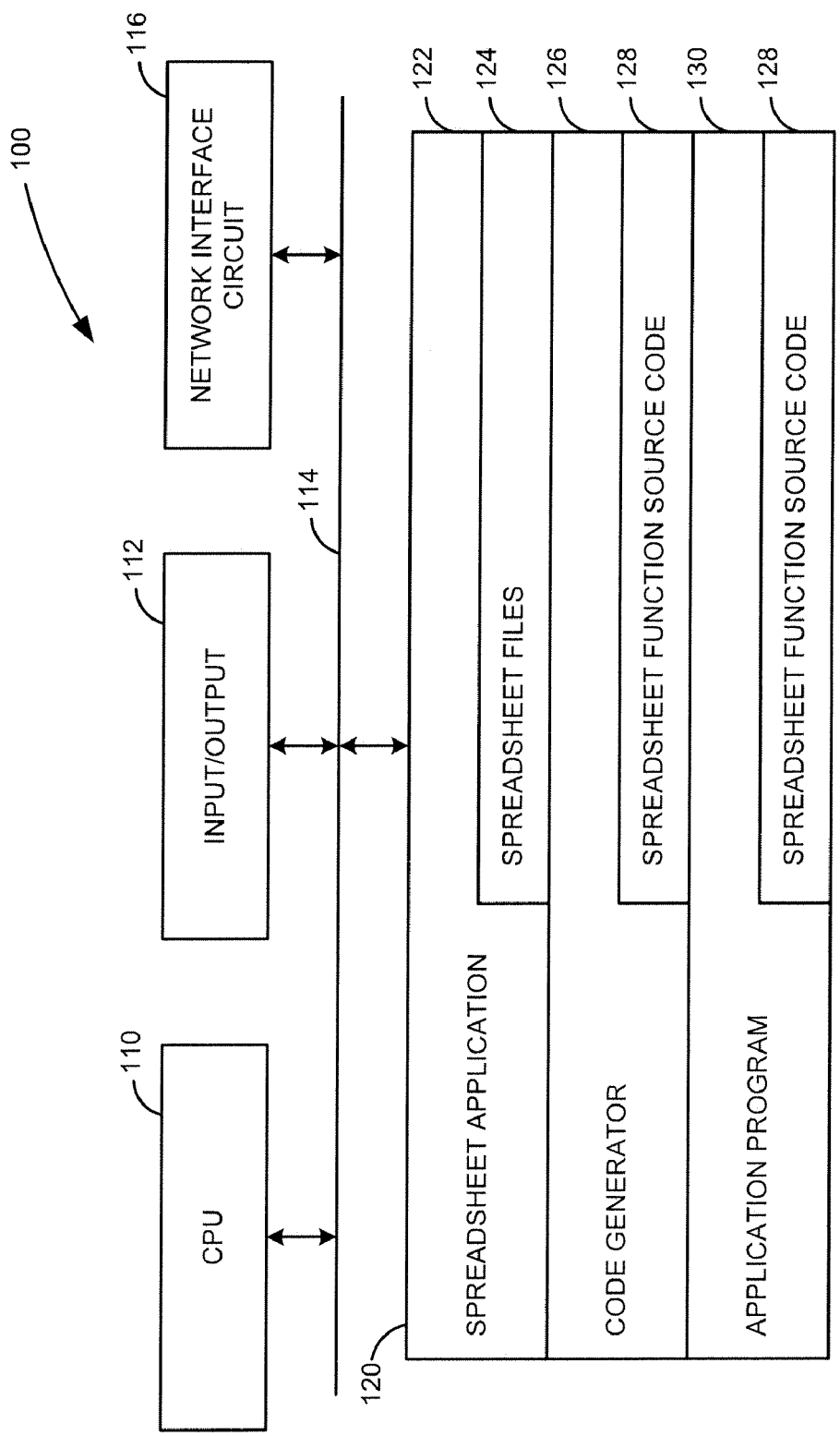
FIG. 1 illustrates a computer configured in accordance with an embodiment of the invention.

FIG. 1 illustrates a computer 100 configured in accordance with an embodiment the invention. The computer 100 has standard components including a central processing unit (CPU) 110 connecting input/output devices 112 via a bus 114. The input/output devices 112 may include devices such as a keyboard, mouse, display, printer, and the like. An optional network interface circuit 116 is also connected to the bus 114. The network interface circuit 116 facilitates communications with networked computers (not shown) and data sources. A memory 120 is also connected to the bus 114. The memory 120 included executable instructions to implement operations of the invention.

In the example of FIG. 1, the memory 120 includes a spreadsheet application module 122 to create, process, store and display spreadsheet files 124 and other spreadsheet information. The spreadsheet files 124 may include a plurality of spreadsheet cells containing numbers and/or formulae. The spreadsheet application module 122 may be a commercially available product, such as Microsoft Excel®.

The memory 120 also includes a code generator module 126 configured in accordance with an embodiment of the invention. The code generator module 126 includes executable instructions to generate spreadsheet function source code 128. In particular, the code generator module 126 includes executable instructions to convert a set of selected spreadsheet cells within a spreadsheet file into spreadsheet function source code characterizing the functionality of the selected spreadsheet cells. Thus, the spreadsheet function source code should not be confused with spreadsheet functions (e.g., sum, product, and the like), although the spreadsheet function source code may express spreadsheet functions.

The source code generator module 126 also includes executable instructions to facilitate the incorporation of the spreadsheet function source code into an application program. Alternately, the spreadsheet function source code may be executed as an independent code base.

An application program module 130 may also be stored in memory 120. The application program module 130 is modified to accept the spreadsheet function source code 128 from the code generator 126.

For purposes of illustration, the components are shown on a single computer. However, modules may be located on different computers. The modules are designed to be distributed and integrated with multiple computers. It is the functions of the modules that are significant, not where they are performed or the specific manner in which they are performed.

Figure 2:
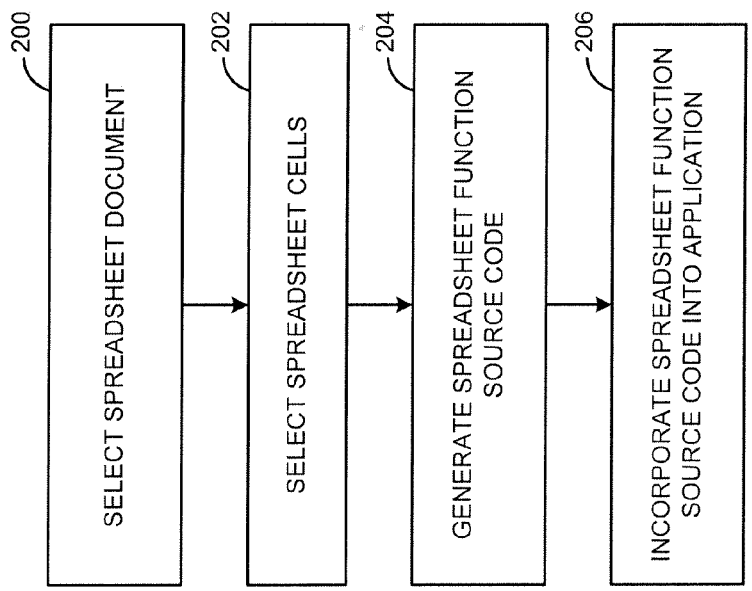
FIG. 2 illustrates a workflow for generating and using spreadsheet components in accordance with an embodiment of the invention.

FIG. 2 illustrates a workflow associated with an embodiment of the invention. The user selects a spreadsheet document 200. In one embodiment, the spreadsheet document is a Microsoft Excel® spreadsheet file. In another embodiment, the spreadsheet document is created with a different application program. The user then selects a set of spreadsheet cells 202. Native tools associated with the spreadsheet application may be used to implement this operation. In an automated embodiment, all cells are selected or a specified set of cells are selected.

Once the desired spreadsheet cells are selected, code generator module 126 processes the selected spreadsheet cells to generate spreadsheet function source code 204 characterizing the data and formulae associated with the selected spreadsheet cells. The code generator 126 may use any number of techniques (e.g., Application Program Interfaces (APIs), function calls and the like) to collect the data and formulae associated with selected spreadsheet cells.

The resultant source code may be in any number of formats or programming languages (e.g. Java®. ActionScript®, and the like). The selection of source code format is typically dictated by the application into which the user desires to export the code.

The code generator 126 operates to insulate a user from having to sequentially program the operations associated with selected cells of a spreadsheet. This is advantageous because many individuals are comfortable programming in a spreadsheet context, but are incapable of converting this information into the highly structured format associated with any given instance of source code. Similarly, many software developers are not necessarily suited for modeling the complex relationships that may exist in a spreadsheet. The code generator 126 allows the utilization of complex spreadsheet relationships without the need to understand or program the underlying math behind the relationships. Thus, the work product of an expert in the spreadsheet domain may be easily ported into a larger software application.

The generated source code may then be stored in memory and subsequently executed. The generated source code may also be incorporated in an application program 206. For example, in one embodiment the generated source code is incorporated in application program 130 as spreadsheet function source code 128.

Figure 3:
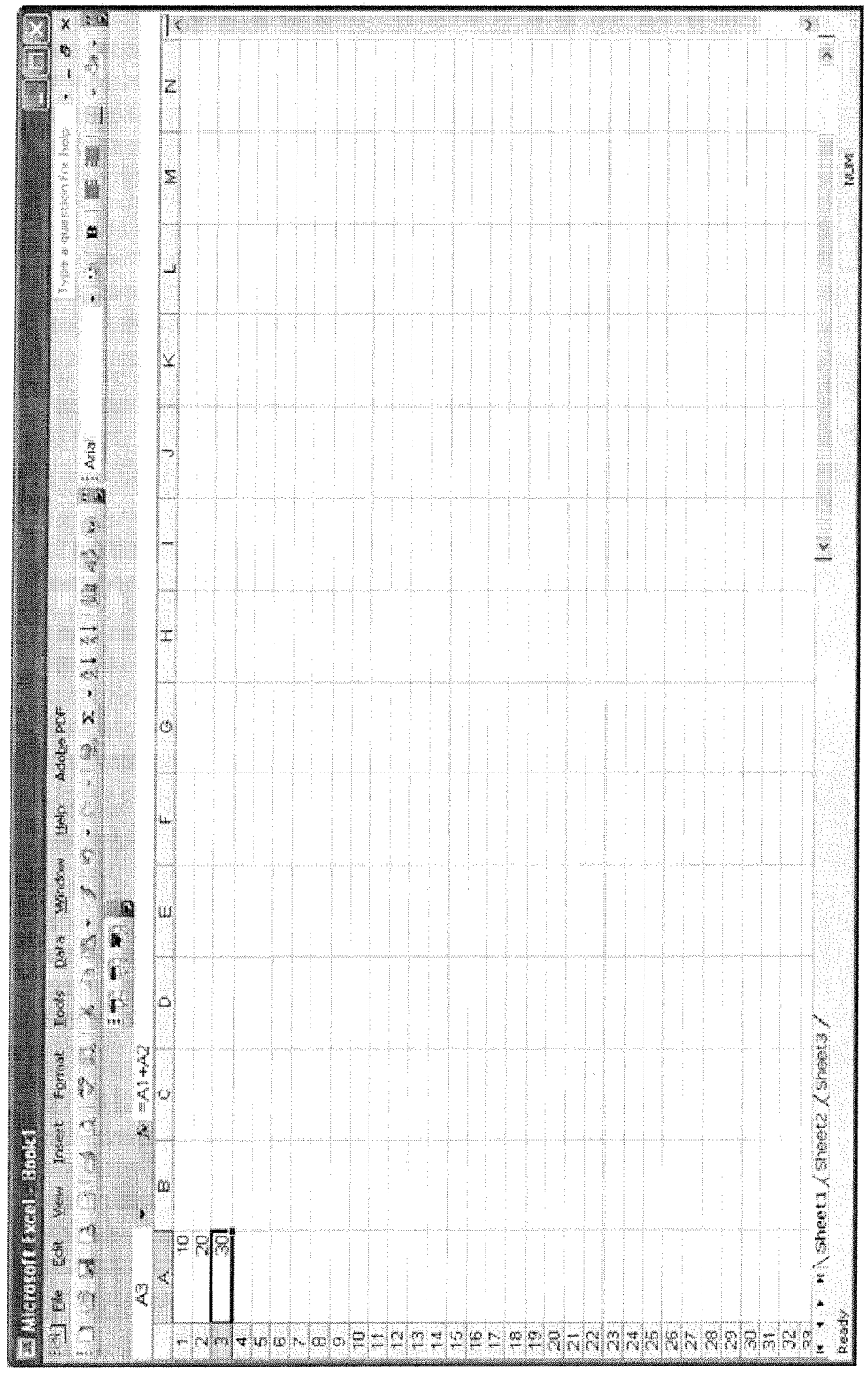
FIG. 3 illustrates a screen shot of a spreadsheet associated with one embodiment of the invention.

FIG. 3 illustrates an exemplary computer screen shot associated with a spreadsheet application. In particular, the screen shot of FIG. 3 displays a representative Microsoft Excel® spreadsheet file, titled "Book1". Cells A1 and A2 contain the numbers 10 and 20, respectively. Cell A3 is associated with the formula A1+A2. Thus, Cell A3 displays the number 30, the result of the application of the formula A1+A2 to the numeric values of cells A1 and A2.

In this example, the user selects the desired spreadsheet cells, such as cells A1 through A3. The code generator 126 reads the selected values and formulae from the spreadsheet and generates source code representing the selected cells.

Figure 4:
FIG. 4 illustrates source code generated in accordance with an embodiment of the invention.

FIG. 4 illustrates exemplary source code 400 generated by the code generator 126. As shown in FIG. 4, the source code 400 models the values and mathematical relationships between the cells selected by the user, in this case the values and formulae associated with the spreadsheet in FIG. 3. For the value A1, the source code included dependency information (A1.dependents=[A3]) and value information (A1.value=10). Similar information is provided for value A2. Value A3 also has dependency information (A3.dependents=[ ]) and function information (A3.calc=function ( ) {return A1.value+value;}). Thus, an aspect of the invention is to explicitly define and utilize cell dependencies.

Thus, the generated code represents the information associated with the selected cells, but is self-contained with no reliance on the spreadsheet. In one embodiment, the generated code has associated get and set properties or functions corresponding to selected cells in the spreadsheet. At execution time of the code, these properties or functions can be used to set the underlying cell values. As these underlying cell values are adjusted, any dependent cells are recalculated and appropriate events are generated indicating which cells have changed. For example, in ActionScript, the code "Spreadsheet.A1=15" could be used to set the value of cell A1 in the spreadsheet engine to 15. This statement causes the spreadsheet engine to recalculate cell C1, which results in an A3 value of 35 (15+20). The spreadsheet then generates an event indicating that C1 has changed, after which the application queries the calculation engine for the new value of the cell.

The source code may now be incorporated into an application program. For example, FIG. 5 illustrates an exemplary screen shot of an Adobe Flex Builder 2 application program wherein an application, titled "example.mxml," is being developed. As shown in FIG. 5, the generated spreadsheet source code 400 illustrated in FIG. 4 is incorporated into the example.mxml application. The code generator 126 may support copy techniques to facilitate this operation. Alternately, the code generator 126 may utilize prompts to specify a file name for the spreadsheet function source code (e.g., "SpreadsheetCode.as"). The application programmer may then call the spreadsheet function source code, for example, using the following code:

```
<mx:Script>
    <![CDATA[
        public function startUp ( ) :void {
            include "SpreadsheetCode.as"
        }
    ]]>
</mx:Script>
```

The spreadsheet function source code may now be compiled by another program or application.

Visual development environments typically include tools such as visual components, data binding, drawing tools and other development aids. Examples of visual development environments include Adobe Flex®, Adobe Flash® and Microsoft Expression Interactive Designer®. These development environments are often extensible allowing for third party product integration through add-ons. They may include features such as documented Application Program Interfaces (APIs) that can facilitate incorporation of add-ons, such as embodiments of the present invention in add-on form, so that the add-ons run directly in the visual development environment.

In one exemplary embodiment of a workflow of the present invention incorporating an add-on, a user creates a user interface in a visual environment through standard techniques. Data bindings are then used to link the graphical environment with the underlying spreadsheet. Binding mechanisms in programming languages allow properties to be bound together. When two properties are bound together, changing one property will cause the binding framework to automatically update the other property with the new value.

FIG. 5 illustrates one example of binding source code 500 associated with an application. The binding source code 500 is also illustrated in FIG. 6 in an enlarged format, which is easier to read. The binding source code 500 generates events to tie into an existing binding framework. As shown in the first three lines of code in FIG. 6, three graphical sliders are defined to correspond to the spreadsheet cells A1, A2 and A3. The next three lines of code in FIG. 6 bind these three graphical components to corresponding spreadsheet cell values.

Figure 7:
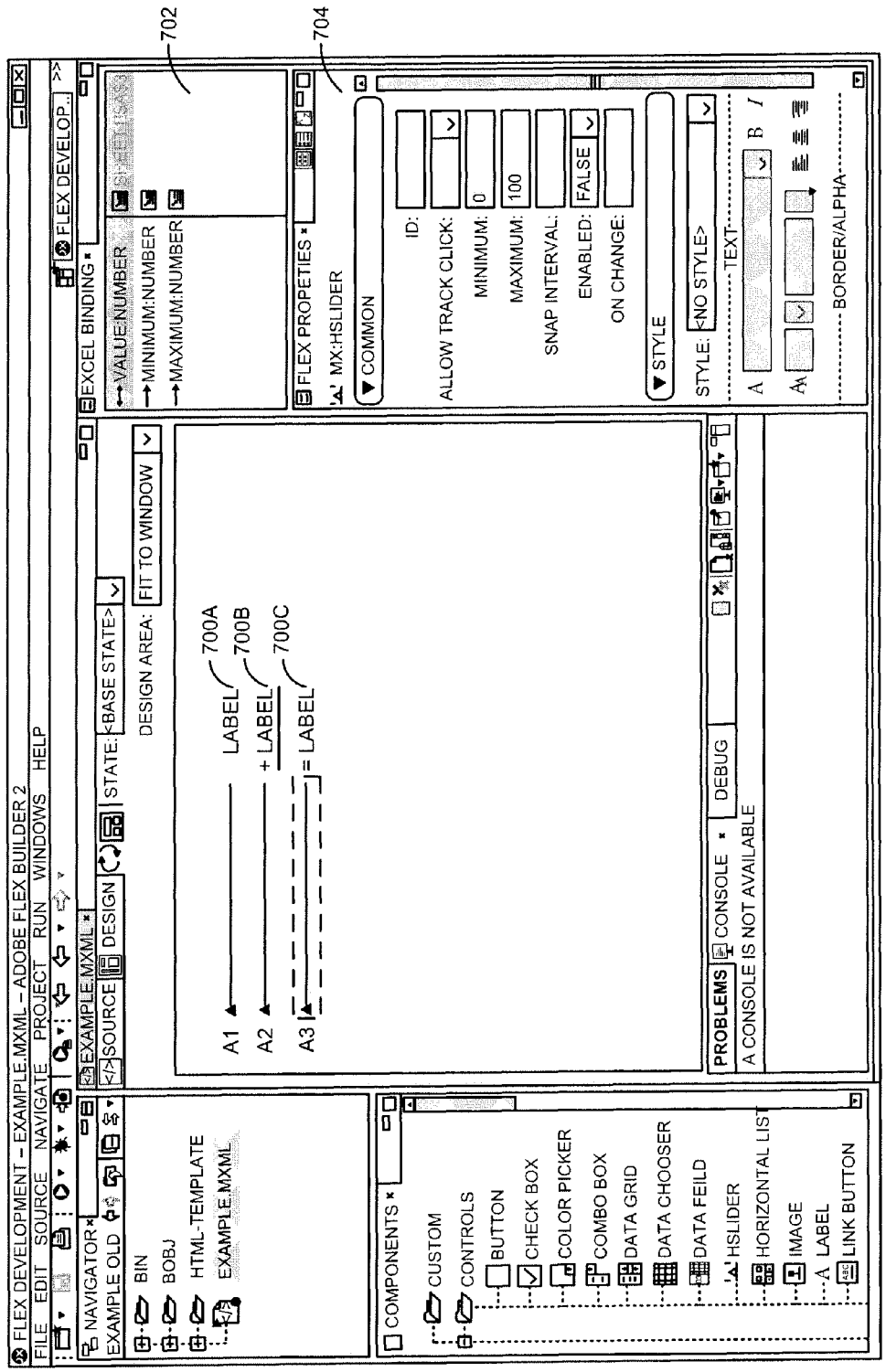
FIG. 7 illustrates a screen shot of an application program development environment associated with an embodiment of the invention.

FIG. 7 illustrates a screen shot of a development application entitled "example.mxml", which uses the Adobe Flex Builder 2 visual development environment. Sliders 700A, 700B and 700C, respectively corresponding to spreadsheet cell values A1, A2 and A3, are depicted. Binding block 702 facilitates the expression of bindings. Properties may be expressed using the properties block 704. A user altering slider values associated with slider 700A will see the resultant change of value at slider 700C. Similarly, altering slider 700B results in changes to slider 700C. In addition, moving slider 700C alters values associated with sliders 700A and 700B. The expressed bindings result in updates to the spreadsheet values. Thus, the techniques of the invention may be used to provide spreadsheet function source code in a larger application with associated graphical components. Manipulation of the graphical components may then result in updates to the spreadsheet.

Some embodiments of the present invention relate to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C#, C++, or other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer-implemented method, comprising:
designating selected spreadsheet cells within a spreadsheet document;
generating spreadsheet function source code characterizing the functionality associated with the selected spreadsheet cells, wherein generating includes designating a selected source code format consistent with a target source code application and wherein generating includes explicitly defining in the selected source code format cell dependencies; and
incorporating the spreadsheet function source code into the target source code application.

2. The method of claim 1 wherein generating includes generating spreadsheet function source code characterizing formulae and data associated with, but not displayed within, the selected spreadsheet cells.

3. The method of claim 1 wherein incorporating includes calling the spreadsheet function source code from the target source code application.

4. The method of claim 1 further comprising creating source code bindings between a graphical component created by the target source code application and the selected spreadsheet cells.

5. The method of claim 4 further comprising updating the selected spreadsheet cell values in response to manipulation of the graphical component.

6. A computer readable storage medium, comprising executable instructions to:
receive selected spreadsheet cells; and
generate spreadsheet function source code characterizing the functionality associated with the selected spreadsheet cells, wherein the executable instructions to generate include executable instructions to designate a selected source code format consistent with a target source code application and executable instructions to explicitly define in the selected source code format cell dependencies.

7. The computer readable storage medium of claim 6 wherein the executable instructions to generate include executable instructions to generate spreadsheet function source code characterizing formulae and data associated with, but not displayed within, the selected spreadsheet cells.

8. The computer readable storage medium of claim 6 further comprising executable instructions to incorporate the spreadsheet function source code into the target source code application.

9. The computer readable storage medium of claim 8 wherein the executable instructions to incorporate include executable instructions to call the spreadsheet function source code from the target source code application.

10. The computer readable storage medium of claim 8 wherein the executable instructions to incorporate include executable instructions to copy the spreadsheet function source code into the target source code application.

11. The computer readable storage medium of claim 6 further comprising executable instructions to execute the target spreadsheet function source code.

12. The computer readable storage medium of claim 6 further comprising executable instructions to create source code bindings between a graphical component created by the target source code application and the selected spreadsheet cells.

13. The computer readable storage medium of claim 12 further comprising executable instructions to update the selected spreadsheet cell values in response to manipulation of the graphical component.

14. A computer readable storage medium, comprising executable instructions to:

designate spreadsheet cells within a spreadsheet document;

generate spreadsheet function source code characterizing the functionality associated with the spreadsheet cells, wherein the executable instructions to generate include executable instructions to designate a selected source code format consistent with a target source code application and the executable instructions explicitly define in the selected source code format cell dependencies; and incorporate the spreadsheet function source code into the target source code application.

15. The computer readable storage medium of claim 14, wherein the executable instructions to generate include executable instructions to generate spreadsheet function source code characterizing formulae and data associated with, but not displayed within, the selected spreadsheet cells.

16. The computer readable storage medium of claim 14 wherein the executable instructions to incorporate include executable instructions to call the spreadsheet function source code from the target source code application.

17. The computer readable storage medium of claim 14 further comprising executable instructions to create source code bindings between a graphical component created by the target source code application and the selected spreadsheet cells.

18. The computer readable storage medium of claim 17 further comprising executable instructions to update the selected spreadsheet cell values in response to manipulation of the graphical component.

* * * * *